United States Patent [19]

Schack et al.

[11] Patent Number: 4,747,342
[45] Date of Patent: May 31, 1988

[54] ANAEROBIC MEAT EMULSIFICATION APPARATUS

[75] Inventors: Warren R. Schack, Leawood; Joseph S. Zeets, Olathe; Richard G. Powers, Overland Park, all of Kans.

[73] Assignee: Marlen Research Corporation, Overland Park, Kans.

[21] Appl. No.: 948,023

[22] Filed: Dec. 31, 1986

[51] Int. Cl.⁴ ............................................ A22C 17/00
[52] U.S. Cl. ...................... 99/472; 99/467; 366/337
[58] Field of Search ................ 99/472, 471, 348, 467, 99/477; 366/139, 336, 337; 241/30, 65, 82.5, 167, 98; 17/33, 35, 39, 49; 426/315, 646, 231, 486

[56] References Cited

U.S. PATENT DOCUMENTS

| | | | |
|---|---|---|---|
| 3,050,399 | 8/1962 | Kielsmier et al. | 426/231 |
| 3,095,022 | 6/1963 | Schmook, Jr. | 241/167 |
| 3,107,392 | 10/1963 | Schmook, Jr. | 17/49 |
| 3,166,784 | 1/1965 | Millenaar et al. | 17/33 |
| 3,170,797 | 2/1965 | Sloan et al. | 426/315 |
| 3,599,556 | 8/1971 | Madsen | 99/472 |
| 3,605,836 | 9/1971 | Schnell | 241/65 |
| 3,908,537 | 9/1975 | Bajcar et al. | 99/472 |
| 3,992,985 | 11/1976 | McFarland | 99/478 |
| 4,382,404 | 5/1983 | Hawley et al. | 366/139 X |
| 4,643,584 | 2/1987 | Allocca | 366/337 |
| 4,700,899 | 10/1987 | Powers et al. | 99/472 X |

Primary Examiner—Timothy F. Simone
Attorney, Agent, or Firm—Hovey, Williams, Timmons & Collins

[57] ABSTRACT

A meat emulsification apparatus and method are provided which allow for in-line emulsification of meat materials without an intermediate conveyor belt or stuffing pump between an emulsifier and casing means and which prevent contact between ambient air and meat materials and products. The preferred apparatus includes a piston-type meat pump for supplying and deaerating meat material; an emulsifier for emulsifying the meat material to produce a meat emulsion; product casing equipment; an imperforate conduit directly operably coupling the emulsifier with the casing equipment while preventing ambient-air contact with the emulsion; and an accumulator operably coupled with the emulsifier and the casing equipment for accumulating and discharging emulsion. In addition, water is advantageously injected into the deaerated meat conduit upstream of the emulsifier.

7 Claims, 1 Drawing Sheet

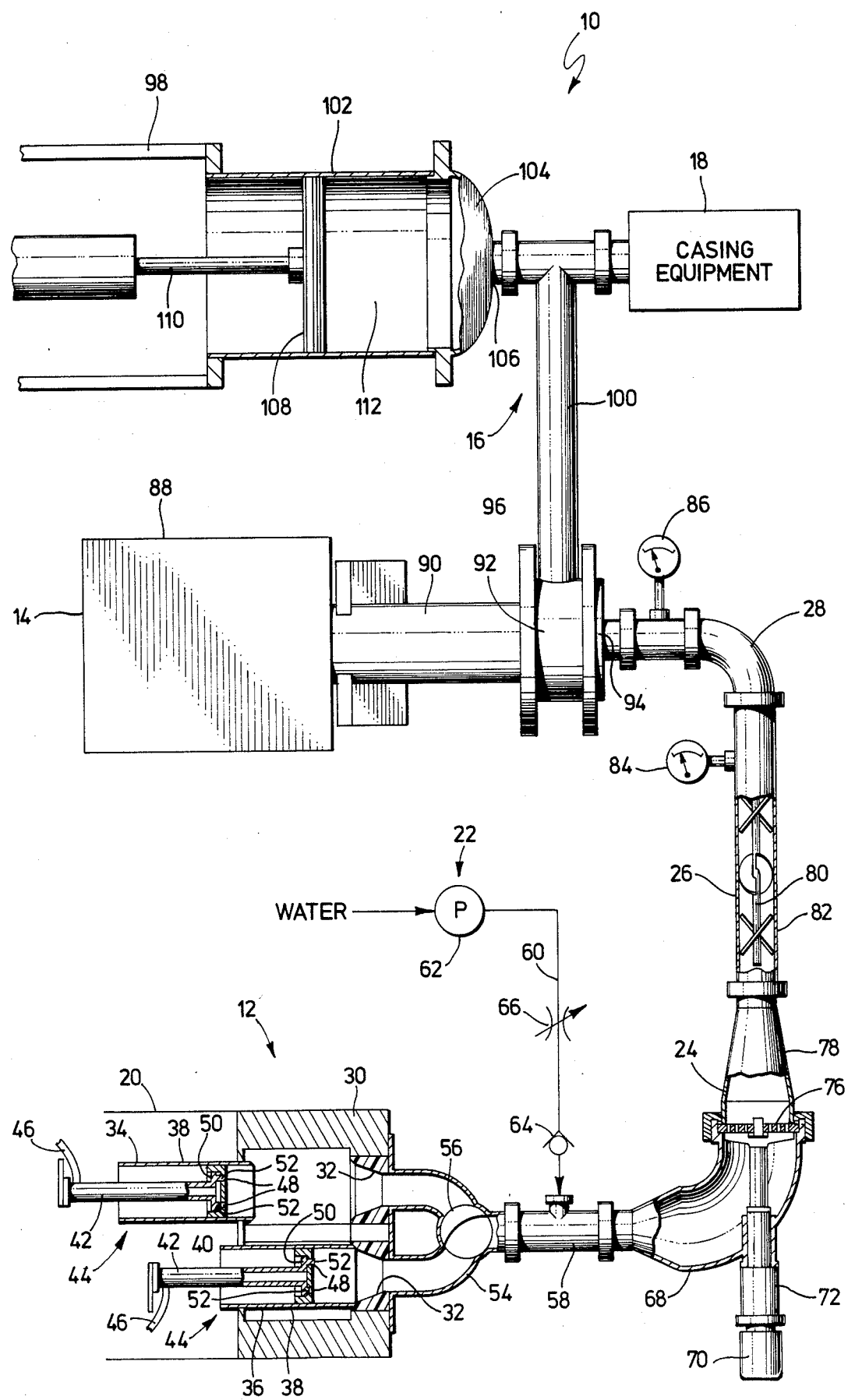

ANAEROBIC MEAT EMULSIFICATION APPARATUS

BACKGROUND OF THE INVENTION

1. Field of the Invention

This invention relates to an apparatus and method for in-line emulsification of meat materials and for preventing ambient air contact with meat emulsions. More particularly, the apparatus and method hereof are concerned with a meat-material emulsifier coupled directly to casing equipment by means of an imperforate conduit and an accumulator which aids in maintaining uniform meat emulsion flow to the stuffer.

2. Description of the Prior Art

Cooked emulsified meat products include sausage-type products such as frankfurters and bologna cooked in a casing. A typical installation for stuffing meat emulsions in a casing includes a bowl chopper, inclined conveyor belt, vacuumizing emulsion pump, transfer pipe, and emulsion casing equipment. In the use of this equipment, portable hoppers or vats transport meat material previously ground to the desired particle size to the bowl chopper. The meat material is then dumped into the chopper along with other ingredients such as water, salt, sugar, and seasonings. The bowl chopper includes a closable lid and the meat material is chopped to the desired size within the closed chopper which draws a vacuum to deaerate the meat material. The chopping process also extracts salt-soluble protein from the meat.

Chopped meat material is then transferred from the chopper by means of a rotating disk assembly to the meat emulsifier. The meat emulsifier causes the fat globules contained in the meat material to be suspended in a matrix of salt-soluble protein. This is necessary in order to prevent the final proudct, such as franks or bologna, from "greasing out" during the cooking process.

After passing through the emulsifier, the meat material is transferred by way of the inclined conveyor belt to the infeed hopper of an emulsion stuffer pump. Typical stuffer pumps must also vacuumize the meat material because the meat is exposed to ambient air on two different occasions after chopping. That is to say, the meat material is exposed to air during transfer from the chopper to the emulsifier and during transfer from the emulsifier to the infeed hopper. The stuffer pump then pumps the meat emulsion by means of a pipe to casing equipment which stuffs the emulsion into casings. The stuffed meat emulsions are then cooked, cooled, and packaged.

A prior art improvement to the above described process exists which provides for in-line grinding in order to prevent exposure of meat materials to ambient air during processing. Such an improvement is disclosed in allowed application Ser. No. 06/788,765 which is incorporated herein by reference and which discloses continuous vacuum grinding method and apparatus. The applicatin Ser. No. 788,765 concerns an apparatus using a piston-type pump which vacuumizes meat particles and then pumps them through an imperforate conduit, through an in-line grinder, and directly into casing equipment thereby preventing contact between ambient air and the final ground product before stuffing into a casing. The method and apparatus of the application Ser. No. 788,765, however, do not disclose a method or apparatus for in-line emulsification or for preventing ambient air contact between ambient air and a meat emulsion.

Furthermore, the prior art does not disclose a method or apparatus for in-line water addition to a meat material after vacuumizing of the meat material. For example, in a vacuumizing piston-type, pump, water cannot be added before vacuumizing the product because the resulting meat-water mixture becomes too viscous or stickey for proper vacuumization of meat.

SUMMARY OF THE INVENTION

The problems outlined above are solved by the method and apparatus of the present invention. That is to say, the method and apparatus hereof provide for in-line emulsification of a meat material and in-line casing of meat emulsion while preventing exposure of the meat emulsion to ambient air. Furthermore, the method and apparatus hereof allow for the use a vacuumizing piston-type meat pump with continuous, in-line water addition.

Broadly, the present apparatus for in-line emulsification of meat material comprises emulsifier means for receiving and emulsifying a meat material in order to produce a meat emulsion therefrom; means for supplying the meat material to the emulsifier means; casing means for receiving and casing the meat emulsion; and transport means including imperforate conduit means for directly and operably coupling the casing means and emulsifier means for transporting the meat emulsion from the emulsifier means to the casing means while preventing contact between the meat emulsion and ambient air.

More particularly, the transport means includes accumulator means operably coupled with the emulsifier means and the casing means for receiving and accumulating meat emulsion from the emulsifier means and for discharging an accumulation of the meat emulsion to the casing means. Additionally, the accumulator means includes structure for accumulating the meat emulsion whenever the emulsifier means is producing the meat emulsion at a rate greater than the rate at which the casing means is casing the meat emulsion, and for discharging an accumulation of the meat emulsion whenever the emulsifier means is producing the meat emulsion at a rate less than the rate at which the casing means is casing the meat emulsion.

Advantageously, the accumulator has a full position and an empty position and includes structure for stopping the supply of meat material and stopping operation of the emulsifier when the accumulator is in the full position and for starting the supply of meat material and starting operation of the emulsifier means when the accumulator is in the empty position.

Broadly, the method of the present invention for in-line emulsification of meat material includes the steps of supplying the meat material from a source thereof to an emulsifier means; emulsifying the meat material in the emulsifier means to produce a meat emulsion; transporting the meat emuslion through imperforate conduit means from the emulsifier means directly to a casing means while preventing contact between the meat emulsion and ambient air; and casing the meat emulsion in the casing means.

The transporting step preferably includes the steps of accumulating the meat emulsion from the emulsifier means in an accumulator whenever the emulsifier means is producing the meat emulsion at a rate greater than the rate at which the casing means is casing the meat emulsion, and discharging accumulated meat emulsion from the accumulator means to the casing means whenever the emulsifier means is producing the meat emulsion at a rate less than the rate at which the casing means is casing the meat emulsion.

Preferably, the accumulator has a full position and an empty position and the method of the present invention further includes the steps of stopping the supplying and the emulsifying of the meat material whenever the accumulator means is in the full position, and the starting the supplying and the emulsifying of the meat material whenever the accumulator means is in the empty position.

The present invention also includes a meat emulsification system comprising pumping means for delivering a stream of meat material, the pumping means including structure for deaerating the meat material; emulsifier means for receiving the stream of meat material and for creating a meat emulsion; casing means for receiving the meat emulsion and for casing the emulsion to yield a final meat product; means including imperforate conduit means for operably coupling the pumping means, emulsifier means, and the casing means respectively in a series relationship and for preventing contact with ambient air of both said material and said emulsion; and means located downstream of the deaerating structure for injecting water into the deaerated meat material.

Preferably, the pumping means includes a piston pump, the conduit means includes an in-line grinder means located within the conduit downstream of the water injecting means and upstream from the emulsifier means and further includes a static mixer located within the conduit downstream of the grinder means and upstream of the emulsifier means.

The present invention also includes a meat emulsification method comprising the steps of producing a deaerated stream of meat; conveying the deaerated stream to an emulsifier while preventing contact between the deaerated meat and ambient air; injecting water into the deaerated meat; and emulsifying the deaerated meat-water mixture.

BRIEF DESCRIPTION OF THE DRAWING

The single drawing FIGURE is a schematic plan view in partial section of the equipment of the present invention.

DESCRIPTION OF THE PREFERRED EMBODIMENT

Referring now to the drawing, the anaerobic meat emulsification apparatus 10 of the present invention broadly includes supply means 12, emulsifier 14, transport means 16, and casing equipment 18.

Supply means 12 includes dual cylinder, reciprocal piston pump 20, water injection assembly 22, continuous, in-line grinder 24, static mixer 26, and conduit 28 operably interposed between rinder 24 and emulsifier 14.

In more detail, pump 20 is a commercially available unit made and sold by Marlen Research Corporation of Overland Park, Kans. and includes a control console (not shown), an infeed auger-hopper (not shown), piston assembly housing 30, and a pair of outlets 32.

Pump housing 30 includes a pair of identical piston and cylinder assemblies 34, 36 which operably communicate with respective outlets 32. Each assembly 34, 36 includes a reciprocal, tubular sleeve 38, a reciprocable, apertured piston 40 within sleeve 38, and a tubular, rearwardly extending piston rod 42 secured to piston 40. Assemblies 34, 36 reciprocate within a chamber of housing 30 communicating with the infeed auger-hopper.

Pump 20 also imcludes deaerating or vacuumizing structure 44 which includes vacuum line 46 coupled to the rearmost end of 42 which communicates with a tubular passageway defined by rod 42. Additionally, each piston 40 includes a plurality of evacuating apertures 48 therethrough. The forward end of rod 42 includes a radially extending plate 50 having pins 52 located for insertion within corresponding apertures 48 during operation of the assembly as will be described.

Pump 20 also includes a conduit structure which specifically includes a bifurcated, generally U-shaped conduit 54, the legs of which are respectively coupled to pump outlets 32. The apex of conduit 54 includes a shiftable diverter valve 56 for the purpose of alternating opening of the respective legs of conduit 54. Moreover, meat pump 20 is described in U.S. Pat. Nos. 4,097,962 and 4,479,614 which are incorporated by reference herein.

Conventional components make up water assembly 22 which includes pipe tee 58, water pipe 60, water pump 62, and check valve 64 and variable orifice valve 66 which are interposed in series in pipe 60. Pipe tee 58 is interposed between the outlet of the diverter valve 56 and grinder 24 with the third leg of tee 58 coupled with water pipe 60 as shown in the drawing FIGURE.

Grinder 24 is commercially available from Marlen Research Corporation of Overland Park, Kans., and includes angled inlet housing 68 which supports hydraulic motor 70 and knife drive 72. A multiple blade grinder knife 74 is affixed to the forward end of drive 72, and coacts with apertured grinder plate 76. The overall grinder 24 further includes a frustoconical outlet housing 78 which leads to and communicates with the inlet of static mixer 26.

An acceptable conventional static mixer 26 is commercially available from Charles Ross and Son Company of Hauppauge, N.Y., and includes vaned mixing module 80 located within mixing housing 82 which is operably coupled between grinder outlet housing 78 and the inlet to conduit 28. Advantageously, mixer 26 also includes pressure gage 84 coupled near the outlet thereof.

Conventional conduit 28 is preferably configured as a 90-degree ell and operably couples the outlet of mixer 26 with the inlet of emulsifier 14. Desirably, conduit 28 includes temperature gage 86 located near the outlet thereof adjacent the inlet of emusifier 14.

Conventional emlsifier 14 is preferably Model AR901 commercially available from Cozzini Brothers Company of Chicago, Ill. Emulsifier 14 includes motor 88, emulsifier drive 90, and emulsion mill 92 having inlet 94 and outlet 96.

Transport means 16 includes accumulator 98 and transport pipe 100 configured as a tee intercoupling emulsifier 14, casing equipment 18, and accumulator 98.

Conventional accumulator 98 is commercially available from Marlen Research Corporation of Overland Park, Kans., and includes housing 102 and end cap 104 with product port 106 defined therein. Accumulator 98 also includes piston 108 coupled with piston rod 110 both of which are received within housing 102. Accumlation chamber 112 is defined in housing 102 between the outboard face of piston 108 and product port 106.

Conventional casing equipment 18 is schematically represented in the drawing FIGURE and can be any type of commercially available equipment suitable for incasing meat emulsion in a casing. The choice of a particular unit depends upon preference of the user and the type of final product desired.

Accumulator 98 also includes a full or high limit switch (not shown) which is activated when accumlation chamber 112 is full, that is, activated by piston rod 110 when it is extended fully leftwardly as viewed in the drawing FIGURE. Additionally, accumulator 98 includes an empty or lower limit switch (not shown) which is activated when chamber 112 is empty, that is, activated by rod 110 when it is extended fully rightwardly. The high and low limit switches are conventionally and operably connected to emulsifier 14, meat pump 20, grinder 24, and water pump 62 whereby these components are shut off when the high limit switch is activated and are restarted when the low limit switch is activated.

In the use of the preferred apparatus as described above, a meat material including other ingredients is introduced into the hopper (not shown) supplying meat pump 20 whereupon the material enters the described piston assembly chamber within the respective assembly housing 30. As illustrated in the drawing FIGURE, piston-cylinder assembly 34 is in the retracted position. Conversely, piston-cylinder assembly 36 is illustrated in the forward moving position having previously received a charge of meat material from the hopper. During retraction of sleeve 38, a vacuum is drawn through line 46 (there being a vacuum pump or other suitable structure, not shown, operably coupled with line 46). Such is accomplished by virtue of apertures 50 and tubular rod 42, permitting deaeration of the meat material.

Next, sleeve 38 is shifted forwardly to its closed position as shown by piston-cylinder assembly 36 in the drawing FIGURE so as to capture and entrap a charge of meat material. During this forward sleeve shifting, the vacuum conditions are maintained so as to assure full deaeration.

Next, the vacuum is relieved without entrance of ambient air and piston rod 42 and piston 40 are moved forwardly so as to expel the charge of deaerated product out of pump 20 and into the associated leg of conduit 54 as shown in the drawing FIGURE by the position of piston-cylinder assembly 36. At this point, pins 52 move forwardly into their associated piston apertures 48 to clear the latter and block flow of meat into the vacuum line, and the piston forces the deaerated charge from associated sleeve. During this sequence, diverted valve 56 is also shifted so as to open the associated leg of conduit 54 into pipe tee 58, so as to define an open flow path for the deaerated meat material through pipe tee 58 and into grinder 24. During the foregoing operation, it will be understood that the adjacent piston assembly is operating in an alternative fashion, i.e., sleeve 38 thereof is retracted and then pushed forwardly to trap a charge of meat material. In this fashion, pump 20 operates in a batch-continuous manner, so as to continuously feed a stream of meat material. In the latter connection, it will be observed that because of the completely closed nature of the overall system, the product remains fully deaerated as it emerges from stuffer 18 wherein it is contained within an appropriate casing.

Next, as the deaerated meat material passes through pipe tee 60, water from water injection assembly 22 enters therein and mixes with the deaerated meat material. Pump 62 recieves a supply of potable water from an appropriate source and delivers the water under pressure through water pipe 60. Variable orifice valve 66 serves to reliably meter the water at the desired flow rate and check valve 64 ensures no back feed into water injection system 22.

Next, the meat material enters grinder 24 through housing inlet 68 where it is ground by virtue of grinder knife 74 through grinder plate 76 and discharged through outlet housing 78.

The meat material leaving grinder 24 enters four element static mixer 26 which provides thorough turbulent mixing of the meat material in order to thoroughly blend the ingredients including water and the meat particles.

The meat material then passes through conduit 28 to emulsifier inlet 94. Pressure gage 84 aids the operator of apparatus 10 to ensure proper operation supply means 12. Temperature gage 86 is provided to ensure that the meat material entering emulsifier 14 is at the proper temperature as this temperature is important to produce a stable meat emulsion in emulsifier 14. The length of conduit 28 is designed so that the meat material passing therethrough has sufficient retention time for salt-soluble protein to be extracted from the meat particles so that the protein is available to form the matrix in the emulsion. Accordingly, conduit 28 can be designed longer or shorter as appropriate to ensure sufficient retention time before the meat material enters emulsifier 14.

The purpose of emulsifier 14 is to reduce the particle size of the meat material in order to provide a very fine matrix of salt-soluble protein trapping meat fat globules therein. A proper emulsion is important to ensure that the fat globules remain entrained within the matrix during cooking to avoid the undesirable condition known as "greasing out" in which fat particles form on the surface of the final meat product during cooling and produce an undesirable appearance and taste in the final product.

The meat emulsion produced by emulsifier 14 exits emulsion mill 92 by way of outlet 96. Transport pipe 100 conveys the meat emulsion to casing equipment 18.

A typical meat emulsion caser is semicontinuous in operation in that it encases continuously into a particular casing and then pauses during changeover to another casing. During the pause between casings, meat emulsion traveling through pipe 100 feeds through product port 106 into accumulation chamber 112. The meat emulsion entering chamber 112 forces piston 108 and piston rod 110 leftwardly as viewed in the drawing figure. Normally, piston rod 110 and piston 108 are biased rightwardly by hydraulic pressure on rod 110 resulting in a pressure within chamber 112 of about 70 psi.

Additionally, emulsifier 14 typically produces a meat emulsion at a rate greater than the rate at which equipment 18 can encase meat emulsion. This also causes emulsion to enter accumulation chamber 112 until accumulator 98 reaches its full or high limit position at which time the high limit switch stops pump 20, water pump 62, grinder 24, and emulsifier 14. Equipment 18, however, continues to operate in its semi-continuous mode and thereby gradually depletes the emulsion from chamber 112 as piston 108 forces the accumulated emulsion outwardly through product port 106 and through transport pipe 100 to the equipment 18. When accumulator 98 reaches its empty or low limit position at which point accuulation chamber 112 is near empty, low limit switch restarts pump 20, water pump 62, grinder 24, and emulsifier 14 begin again supplying emulsion to pipe 100 and ultimately equipment 18. Thus, equipment 18 operates continuously while the other components of the system automatically turn off and restart according to the action of accumulator 98.

As those skilled in the art will appreciate, the design of apparatus 10 prevents contact between ambient air and both the meat material and the meat emulsion contained therein and ambient air. Thus, the absense of any entrained air in the final product produced by apparatus 10 allows production of a high density product and inhibits any product degradation which may be caused by entrained air. Additionally, the arrangement of apparatus 10 eliminates the necessity for an intermediate incline conveyor, hopper, and emulsion stuffing pump. Thus, the apparatus and method of the present invention provide for a more economical and more efficient production process from the standpoint of equipment and labor while simultaneously providing a product with quality higher than that previously obtainable for meat eumulsion products.

Specific and detailed examples of the use of the apparatus and method of the present invention are discussed hereinbelow.

EXAMPLES

EXAMPLE 1

Beef Frankfurters

|  | Lbs. | % Fat | Fat | Bind Factor | Bind Combination |
|---|---|---|---|---|---|
| Lean cow meat (less tenders) | 125 | 13 | 4.06 | 96 | 30.0 |
| Plates and/or flanks | 155 | 50 | 19.37 | 36 | 13.9 |
| Primal beef trimmings | 120 | 34 | 10.20 | 58 | 17.4 |
|  | 400 |  | 33.63 |  | 61.3 |
| Water | 100 | COMBINED FORMULA TARGETS | | | |
| Salt | 9.0 |  | Bind | | |
| Sugar | 4.0 | Fat | Factor | | |
| Seasoning | 4.0 | 26.0 | 47.4 | | |
|  | 517.0 | Total Formula Weight | | | |

The meat was coarse ground using a Hobart 8 8/5", four-hole plate. Then the meat was chill-mixed to 27°–28° F. When the temperature reached 30° F., the salt, sugar, and seasoning were added and blended into the meat during the final two-to-three minutes of mixing. This mixture was placed into a Marlen ribbon auger-hopper.

As the meat fed into the cylinders of a Marlen food pump, it was deaerated using the Marlen vacuum piston system. It was pumped to an in-line grinder at a rate of 116.7 lbs. per minute with the addition of 33.3 lbs. per minute of water at 160° F. The continuously fed mix was fine ground through 8 ⅜" diameter plate having 3/32" diameter holes followed by soluble protein extraction in line ahead of the emulsifier. A turbulent flow static mixer was used to promote this extraction at a temperature of approximatey 55° F. The mix then was emulsified through 1 mm. plate openings at 9,000 lbs. per hour with a temperature rise to 70°–72° F. After emulsification, the finished product was stuffed into casings at a rate between 7,200 and 8,000 lbs. per hour. Since the flow through the emulsifier was 9,000 lbs. per hour, the excess accumulated in a presure accumulator to a high set point which, when reached, shut down the preparation process. The accumulator maintained the desired flow rate until a set point was reached and the prepartion systems was restarted.

After casing, the sausage was linked, placed on smoke sticks and given a normal frankfurter process to 160°–165° F. internal temperature before chilling and packaging.

EXAMPLE 2

Pork and Beef Frankfurthers

|  | Lbs. | % Fat | Fat | Bind Factor | Bind Combination |
|---|---|---|---|---|---|
| Extra lean cow meat | 90 | 8.0 | 1.8 | 82 | 18.4 |
| Special lean pork trim | 60 | 28.0 | 4.2 | 77 | 11.6 |
| Regular pork trim | 120 | 58.0 | 17.4 | 35 | 10.5 |
| Regular beef trim | 130 | 30.0 | 9.7 | 75 | 24.3 |
|  | 400 |  | 33.1 |  | 64.8 |
| Water | 100 | COMBINED FORMULA TARGETS | | | |
| Salt | 9 |  | Bind | | |
| Sugar | 4 | Fat | Factor | | |
| Seasoning | 4 | 26.0 | 47.4 | | |
|  | 517 | Total Formula Weight | | | |

The handling was identical to Example 1 except that the water was injected at 140° F. to achieve 50° F. for the soluble protein extraction prior to emulsification. Also, the emulsified temperature was 66°–68° F.

EXAMPLE 3

Pork Frankfurters

|  | Lbs. | % Fat | Fat | Bind Factor | Bind Combination |
|---|---|---|---|---|---|
| Special lean pork trim | 165 | 28.0 | 11.6 | 77 | 31.8 |
| Regular pork trim | 135 | 58.0 | 19.6 | 35 | 11.8 |
| Extra lean pork trim | 75 | 8.0 | 1.5 | 82 | 15.4 |
| Blade meat | 25 | 10.0 | 0.6 | 96 | 6.0 |
|  | 400 |  | 33.3 |  | 65.0 |
| Water | 100 | COMBINED FORMULA TARGETS | | | |
| Salt | 9 |  | Bind | | |
| Sugar | 4 | Fat | Factor | | |
| Seasoning | 4 | 25.8 | 50.2 | | |
|  | 517 | Total Formula Weight | | | |

The handling was identical to Example 1 except that the water was injected at 125° F. to achieve 48° F. for the soluble protein extraction prior to emulsification. Also, the emulsified temperature was 63°–65° F.

EXAMPLE 4

Pork Frankfurters

The same formula used in Example 3 is prepared using a conventional vacuum chopper method to replace the deaeration, water injection, and soluble protein extraction described therein. All ingredients are combined in the chopper using normal procedure for such preparation with the final temperature target of 47°-52° F. before ending the chopping cycle.

This deaerated material is placed into the Marlen pump using a standard hopper (not a ribbon auger type). The material is then pumped to the emulsifier at the rate of 9,000 lbs. per hour. The action of the accumulator is the same as for Example 1 as was all subsequent handling.

EXAMPLE 5

Chicken Frankfurters

|  | Lb. | Fat | Combination Bind |
| --- | --- | --- | --- |
| Mechanically deboned chicken | 400 | 18.0 | 58 |
| Water | 100 | COMBINED FORMULA TARGETS | |
| Salt | 9 | | Bind |
| Sugar | 4 | Fat | Factor |
| Seasoning | 4 | 13.9 | 44.9 |
| | 517 | Total Formula Weight | |

The handling was the same for Example 4 except the final chopping temperature of the meat was 32° F., and the emulsified temperature was controlled to 38°-40° F.

All examples produced product densities of at least 1.02 for stuffing.

We claim:

1. Apparatus for continuous, in-line emulsification of meat material, comprising:
   emulsifier means for receiving meat material and for emulsifying the same, said emulsifier means including a housing defining a chamber presenting a meat material-receiving inlet, an outlet for discharging meat emulsion from the chamber, and structure for reducing the particle size of the meat material and elevating the temperature thereof in order to produce a meat emulsion having meat fat globules entrapped by a matrix of soluble protein;
   transport means coupled with said emulsifier outlet for receiving said emulsion discharged therefrom and for transporting said emulsion to a downstream location spaced from said emulsifier outlet; and
   supply means coupled with said emulsifier inlet for receiving said meat material from a source thereof and for supplying said meat material under pressure to said emulsifier chamber, said supply means including
      pump means for receiving and pumping said meat material to create a meat material output stream, said pump means having a pump inlet for receiving said meat material from said source, and a pump outlet for discharging said output stream under pressure; and
      enclosed pipe means intercoupling said pump outlet and said emulsifier inlet for receiving said output stream from said pump outlet, for conveying said output stream under pressure to said emulsifier chamber, and for preventing contact between ambient air and said meat material during conveyance of the output stream through said pipe means, whereby said output stream of meat material is force-fed to said emulsifier chamber.

2. Apparatus as set forth in claim 1, including grinding apparatus interposed in said closed pipe means between said pump outlet and emulsifier inlet.

3. Apparatus as set forth in claim 1, including means located within said closed pipe means for subjecting said meat material output stream to a mixing action.

4. Apparatus as set forth in claim 1, including accumulator means operably coupled with said emulsifier means outlet for receiving and accumulating meat emulsion from said outlet as required.

5. Apparatus as set forth in claim 4, said accumulator means comprising a tubular body sealed to the entrance of ambient air and presenting a product inlet port operably coupled with said emulsifier outlet, a piston axially and slidably received within said body, and means for biasing said piston toward said product inlet port.

6. Apparatus as set forth in claim 1, said pump means comprising a piston pump.

7. Apparatus as set forth in claim 1, said supply means, emulsifier means, and transport means being constructed and arranged for maintaining meat material out of contact with ambient air between said pumping means and downstream location.

* * * * *

UNITED STATES PATENT AND TRADEMARK OFFICE
Certificate

Patent No.: 4,747,342                                                        Patented: May 31, 1988

On petition requesting issuance of a certificate of correction of inventorship pursuant to 35 USC 256, it has been found that the above-identified patent, through error and without any deceptive intent, improperly sets forth the inventorship. Accordingly, it is hereby certified that the correct inventorship of this patent is:
Warren R. Schack, Joseph S. Zeets, Richard G. Powers and Charles R. Rudibaugh.

Signed and Sealed this Seventeenth Day of April, 1990.

HARVEY C. HORNSBY

*Supervisory Patent Examiner*
*Patent Examining Art Unit 242*